United States Patent Office 3,475,474
Patented Oct. 28, 1969

3,475,474
METHOD FOR PREPARING CYANOALKYLENE TIN CARBOXYLATES
William J. Considine, Somerset, and Gerald H. Reifenberg, Plainfield, N.J., assignors to M&T Chemicals Inc., New York, N.Y., a corporation of Delaware
No Drawing. Filed Jan. 3, 1966, Ser. No. 518,031
Int. Cl. C07f 7/22
U.S. Cl. 260—429.7
6 Claims

ABSTRACT OF THE DISCLOSURE

A method is provided for preparing novel organotin salts and the compounds produced thereby in which said compounds are characterized by the presence of a nitrile group of the general formula $$[NC(CH_2)_m]-$$

wherein $m$ is at least about 2, said method including the steps of reacting a metal salt of a carboxylic acid with a tetravalent organotin halide of the general formula $$[NC(CH_2)_m]_n SnX_{4-n}$$

in which $m$ is at least about 2, $n$ is 1–3 inclusive, and X is chlorine, bromine, and iodine and with said metal salt of a carboxylic acid being capable of forming a metal halide less soluble than the resultant organotin ester, and recovering the product of said reaction. The said salts find applications as biocides and plastic stabilizers.

---

This invention relates to methods for preparing tetravalent organotin salt and more particularly to methods for preparing organotin compounds of the aforenamed type characterized by the presence of a nitrile group of the general formula:

$$[NC(CH_2)_m]$$

wherein $m$ is an integer at least about 2. Reference is made to our copending application filed concurrently herewith entitled, "Organotin Mercaptides and Esters" Serial No. 518,025 which relates to different methods for preparing organotin esters and mercaptides and novel organotin compounds.

It is the object of this invention to set forth a technique of preparing organotin salts characterized by the presence of a nitrile group. In accordance with this invention, the novel method comprises reacting a metal salt of a carboxylic acid with a tetravalent organotin halide of the general formula:

$$[NC(CH_2)_m]_n SNX_{4-n}$$

in which $m$ has the same meaning as depicted above, $n$ is an integer 1–3, and X is chlorine, bromine, and iodine. The metal carboxylate that can be used for the process of this invention is the type capable of forming a metal halide less soluble than the resultant organotin salt of the formula:

$$[NC(CH_2)_m]_n SNL_{4-n}$$

in which L is a monovalent acyloxy radical, an organic residual of said metal carboxylate. The organotin salt thus formed is conveniently recovered from the reaction medium.

The suitable organotin halides may be prepared by any of the available methods. Preferably, they are prepared by the methods disclosed in our copending patent applications filed concurrently herewith entitled, "Organotin Complex" Serial No. 517938 and "Organotin Halides"' Serial No. 526,932, in which the organotin halides are prepared respectively, by redistribution and by halogenation. In the former case, the 1:1 complex of $[NC(CH_2)_m]_4Sn$ and $SnX_4$ is redistributed by heating to form a composition containing $[NC(CH_2)_m]_3$-SnX, $[NC(CH_2)_m]_2SnX_2$ and $[NC(CH_2)_m]SnX_3$. Each of the three halides are then isolated from the redistribution mixtures. In the latter case, the halides are prepared by reacting an active halogen with an organotin of the formula:

$$[NC(CH_2)_m]_n SnR_{4-n}$$

in which $n$ is an integer 1–3, and R is an alkyl, aryl, alkaryl, aralkyl or an alkenyl. In either case, the resultant halides are of sufficient purity that we found to be eminently suitable for the present invention. The preferred halides have the formula:

$$[NC(CH_2)_m]_3 SnX$$

in which $m$ is an integer 2–4, and X is chlorine or bromine.

As stated previously, the metal salts of carboxylic acids that are suitable must be capable of forming a metal halide that is less soluble than the resultant organotin salt so that the recovery of the salt can be facilitated. The metal salt must also have sufficient solubility in the reaction medium. Among the metal carboxylates that fall within the class just described, we found silver acetate and thallous acetate to be particularly suitable. Generally, the silver and thallium salts of saturated lower monocarboxylic acids such as formic acid, propionic acid, etc., and the unsaturated lower monocarboxylic acids such as acrylic acid, methacrylic acid, etc., may be used.

In the preferred embodiment of this invention, the tris [ω-cyanopolymethylene] tin monohalide is preferably reacted with a suitable metal carboxylate in an aqueous solvent consisting of water and a miscible organic solvent, i.e. water-acetone mixture. In such a reaction, the reactants used are preferably the stoichiometric amount.

Further to illustrate this invention, specific examples are described hereinbelow.

EXAMPLE I

Preparation of tris(2-cyanoethyl-)-tin acetate $$(NCCH_2CH_2)_3SnBr + AgOAc \xrightarrow[\text{acetone}]{\text{Aq.}} (NCCH_2CH_2)_3SnOAc + AgBr$$

To a solution of $(NCCH_2CH_2)_3SnBr$ (0.048 mole) in 200 ml. of 1:1 aqueous acetone was added rapidly solid silver acetate (8.2 g., 0.049 mole) with stirring. After stirring for an additional 30 minutes at room temperature, the mixture was filtered with suction. The clear, colorless filtrate, which gave a negative bromide ion test, was evaporated to dryness on a rotary evaporator under reduced pressure (flask was covered with aluminum paper to protect it from light). 15.0 g. (92.0%) of crude tris(2-cyanoethyl)-tin acetate was obtained as a grey-black solid. Product was dissolved in 200 ml. of hot tetrahydrofuran containing a little decolorizing charcoal. After filtering solution by gravity, the filtrate was colorless. Addition of 120 ml. of dry ethyl ether caused a white crystalline solid to precipitate. Upon filtration, 8.5 g. of tris(2-cyanoethyl) acetate was obtained. Another 1.5 g. of this material was recovered by concentrating mother liquor from first crop to about 40 ml. and adding 5 ml. of dry ethyl ether. M.P. and mixed M.P. of both crops was 146–8°. Yield of tris- (2-cyanoethyl)tin was 61.3%. Further recrystallization of the combined crops from a tetrahydrofuran-ethyl ether solvent pair did not improve melting point.

*Analysis.*—Calcd. for $C_{11}H_{15}N_3O_2Sn$: Sn, 34.94; N, 12.36. Found for $C_{11}H_{15}N_3O_2Sn$: Sn, 34.68; N, 12.21.

EXAMPLE II

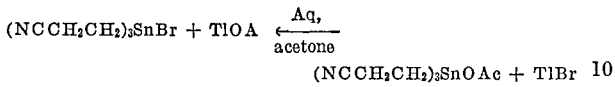

100 mls. of distilled $H_2O$ containing 100.0 gms. of dissolved $CH_3COOTl$ was added slowly with agitation into 400 mls. of acetone containing 137.0 gm. of dissolved tris(2-cyanoethyl)tin bromide, and a yellow precipitate was immediately formed. The yellow solids (TlBr) is removed by filtration and the clear filtrate containing the acetate was evaporated to dryness under reduced pressure. 129.0 gms. (~100%) of crude tris-(2-cyanoethyl)-tin acetate was obtained as a white crystalline solid. The product was dissolved in 220 mls. of hot THF to form a clear yellow solution. The acetate was recovered in substantially the same manner as in Example I. The resultant white crystalline solid had a melting point of 150–151. The yield was 86.6%.

*Analysis.*—Calcd. for $C_{11}H_{15}N_3O_2Sn$: Sn, 34.94. Found for $C_{11}H_{15}N_3O_2Sn$: Sn, 35.17.

The thallous acetate procedure appeared to be better because there is no blackening of the product during isolation. The compounds prepared according to the methods of this invention may find applications as biocides and plastic stabilizers.

We claim:

1. A method for preparing an organotin compound of the general formula:

$$[NC(CH_2)_m]_nSnL_{4-n}$$

in which $m$ is an integer at least about 2, $n$ is an integer 1–3 and L is a monovalent acyloxy radical, which comprises reacting a metal salt of a carboxylic acid with a tetravalent organotin halide of the general formula:

$$[NC(CH_2)_m]_nSnX_{4-n}$$

in which X is selected from the group consisting of chlorine, bromine and iodine to form said organotin compound and a corresponding metal halide of said carboxylic acid salt, said metal salt of a carboxylic acid being selected so that the resultant metal halide is less soluble in the reaction medium than said organotin compound, and recovering said organotin compound from the reaction medium.

2. A method for preparing an organotin compound of the general formula:

$$[NC(CH_2)_m]_3SnL$$

in which $m$ is an integer at least about 2, and L is a monovalent acyloxy radical, which comprises reacting in an aqueous solvent a metal carboxylate with a tetravalent organotin halide of the general formula:

$$[NC(CH_2)_m]_3SnX$$

in which X is selected from the group consisting of chlorine, bromine, and iodine to form said organotin compound and a corresponding less soluble metal halide in the reaction medium, and recovering said organotin compound from the reaction medium.

3. A method according to claim 2 wherein the aqueous solvent is a mixture of water and an organic solvent miscible with water.

4. A method according to claim 3 wherein the aqueous solvent is aqueous acetone.

5. A method according to claim 2 wherein the tetravalent organotin halide is $$[NCCH_2CH_2]_3SnBr$$

and the metal carboxylate is selected from the group consisting of silver acetate and thallous acetate.

6. A method according to claim 5 wherein about a stoichiometric amount of acetate and $$[NCCH_2CH_2]_3SnBr$$

are used in the reaction.

References Cited

UNITED STATES PATENTS

| | | | |
|---|---|---|---|
| 2,560,034 | 7/1951 | Eberly | 260—429.7 |
| 2,570,686 | 10/1951 | Johnson et al. | 260—429.7 |
| 2,684,973 | 7/1954 | Mack et al. | 260—429.7 |
| 2,759,906 | 8/1956 | Leistner et al. | 260—429.7 X |
| 2,786,813 | 3/1957 | McDermott | 260—429.7 X |

TOBIAS E. LEVOW, Primary Examiner

W. F. W. BELLAMY, Assistant Examiner

U.S. Cl. X.R.

260—999, 45.75